Nov. 14, 1950 J. KREITNER 2,530,304

ROTARY COMPUTER

Filed Aug. 21, 1945 3 Sheets-Sheet 1

INVENTOR.
JOHN KREITNER
BY
Bertram Ottinger
ATTORNEY

INVENTOR.
JOHN KREITNER
BY
Bertram Ottinger
ATTORNEY

Nov. 14, 1950 J. KREITNER 2,530,304
ROTARY COMPUTER
Filed Aug. 21, 1945 3 Sheets-Sheet 3
Fig. 15.
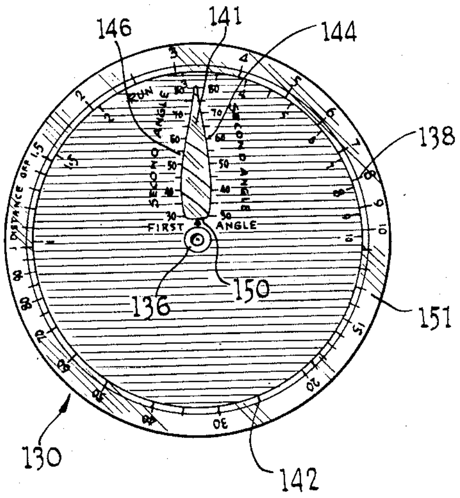
Fig. 16. Fig. 17.
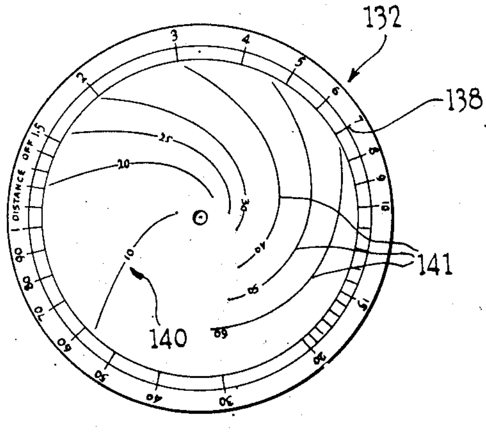
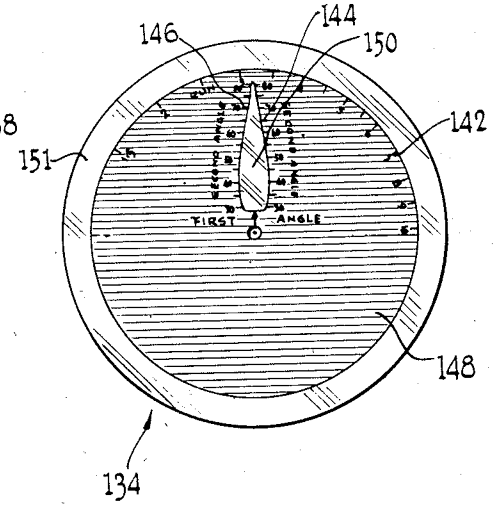
INVENTOR.
JOHN KREITNER
BY
Bertram Ottinger
ATTORNEY Patented Nov. 14, 1950 2,530,304

UNITED STATES PATENT OFFICE 2,530,304

ROTARY COMPUTER

John Kreitner, New York, N. Y., assignor to Sixtal Development Company, Beacon, N. Y., a co-partnership composed of John Kreitner, Robert M. Kristal, Franz Winkler, Teresa Kreitner, and Rudolph Fleischmann Application August 21, 1945, Serial No. 611,727

16 Claims. (Cl. 235—84)

This invention relates to rotary computers.

Rotary computers conventionally comprise a plurality of superposed discs cooperatively mounted for relative rotation about an axis perpendicular to the planes of the discs. Said discs may be fabricated from plastic, the material used preferably having excellent dimensional stability and resistance to abrasion, for example a vinylidene chloride polymer. Divers scales, suitably provided on the various discs, are mutually arranged in accordance with certain functional relationships between the variables represented by the scales, whereby through a series of operations, including one or more relative angular settings of the discs, a definite value may be ascribed to one variable, if the values of the remaining variables are known.

Rotary slide rules serve the same purpose and operate in approximately the same manner as linear slide rules, and, in addition, are capable of solving types of problems not possible on a linear slide rule. Nevertheless, linear slide rules have been almost exclusively employed wherever accuracy was a prime requisite because the same standard of accuracy thus far has not been reached with rotary slide rules.

It is a principal object of the present invention to provide a rotary computer whose accuracy is substantially the same as that of a good linear slide rule having the same lengths of scales.

The construction of an ordinary rotary computer is simple, inexpensive and compact because its discs are flat and because the means joining the discs for mutual rotation is a rivet or the like. Rotary computers, heretofore, have had their scales located on the upper face of each disc and I have determined that it was this disposition of the scales on the flat discs which was one major source of error in said computers. With the scales placed in the foregoing manner, co-related scales on two adjacent discs were spaced apart at least the thickness of a disc. Even if this distance were only two one-hundredths of an inch, the error, when the line of sight deviated 14° from normal, was five one-thousandths of an inch, a wholly unpermissible error for many purposes. Such error was the result of parallactic deviation.

It has been proposed to obviate this defect by setting the uppermost discs in a circular recess or opening in the lower disc and thereby locating the co-related scales on both discs in a common plane. However, this application of the principle to which linear slide rules owe their accuracy necessitated the use of close tolerances and relatively complex construction, making the rotary computer very expensive to manufacture and leaving to it only the advantage of compactness.

It is a further object of the invention to provide a rotary computer whose accuracy is enhanced by the elimination of parallax without sacrificing the simple construction of flat disc computers.

Present day flat disc computers commonly have their discs mounted so that the flat faces thereof are in rubbing engagement. Furthermore, the peripheral contour of an upper disc customarily lies directly above the scale markings on the lower disc. I have ascertained that this construction and arrangement is the source of another error which, for convenience, I will refer to as the "shade effect." The portion of the upper disc remote from a source of light casts a more or less dark, broad shadow line on the lower disc which tends to separate the scales on the two discs. When reading from one to the other of said scales the graduation lines have to be mentally projected across the shadow line. This shade effect makes accurate reading, and particularly interpolation, very difficult. Under certain conditions the opposite side of the upper disc reflects a bright line on the lower disc which gives rise to the same trouble as the shadow line.

It is another object of my invention to provide a rotary computer of the character described in which shade effect is wholly eliminated.

The invention also contemplates the reduction of error due to inaccurate location of the center of relative rotation of the discs. This error generally arises when four or more co-related scales are employed, at least two on each disc. Unless windows are used, the two scales on each disc must be laid off on diametrically opposite sides of the disc. Thus, if the point where variable $a$ on the upper disc is set at variable $b$ on the lower disc is considered as the "North" point, the reading from variable $c$ on the upper disc to variable $d$ on the lower disc will occur somewhere near the "South" point. At the "South" point the error from misalignment of centers will be double the displacement of the center of rotation. This limits windowless rotary computers with four or more variables to methods of manufacture which involve extremely close tolerances in locating the center of rotation and make the cost of the computers too high for everyday use.

Such error, caused by inaccurate center drilling, can be greatly reduced, if all four scales lie on the same side of the center. This, however, requires use of a window in the top disc. If said window is cut out of the top disc, as is usual in present-day rotary computers, it causes a weakening of the top disc and gives rise to a shade effect. Where the length of the scale requires a window of considerable circumferential extent, it weakens the top plate so far as to cause distortion thereof, thereby introducing another source of error. It is thus appreciated that a cut-out window should never cover more than 90° because of distortion and can not, of course, ever extend 360°.

It is an additional object of my invention to provide rotary computers having windows which do not weaken the disc wherein they are present, and which can extend 360° without separating a disc into two pieces.

Other objects of my invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings in which are shown various possible embodiments of the invention, Fig. 1 is a top plan view of the bottom disc of a rotary computer embodying the invention;

Fig. 15 is a top plan view of a coasting computer embodying the invention; and

Figs. 16 and 17 are top plan views of the bottom and top discs, respectively, of the computer shown in Fig. 15.

Figures 1, 2, 3, 4, 5, 6, 7, 8:
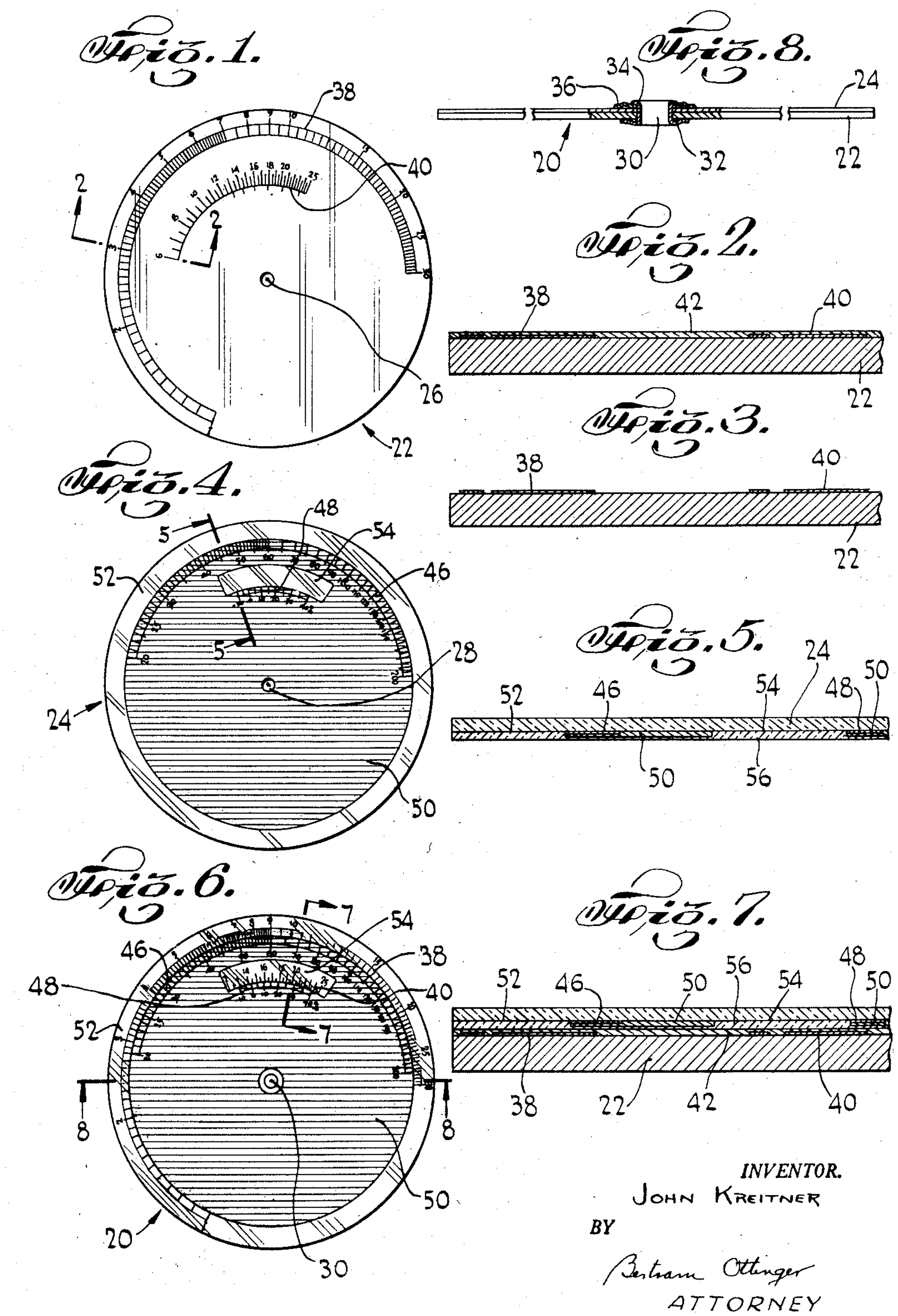
Fig. 2 is an enlarged fragmentary sectional view therethrough, taken substantially along the plane indicated by the line 2—2 in Fig. 1.
Fig. 3 is a view similar to Fig. 2 but showing the top disc before a protective film is applied thereto.
Fig. 4 is a top plan view of the top disc of said computer.
Fig. 5 is an enlarged fragmentary sectional view through said top disc, taken substantially along the plane indicated by the line 5—5 in Fig. 4.
Fig. 6 is a top plan view of the computer.
Fig. 7 is an enlarged fragmentary sectional view through the computer, taken substantially along the plane indicated by the line 7—7 in Fig. 6.
Fig. 8 is a sectional view through the computer, taken substantially along the plane indicated by the line 8—8 in Fig. 6.

In carrying out my invention, I provide two discs which are mounted for relative rotation about an axis perpendicular to the planes of the discs. Both discs are flat, i. e., unrecessed except for a small central through aperture, so that the top disc is disposed completely above the bottom one. Additionally, the discs are arranged to have their adjacent flat faces in rubbing or sliding engagement.

Each disc has one or more scales suitably provided thereon, as by printing or engraving. The scales on the two discs are co-related, that is, they are so mutually arranged that an unknown variable represented on one scale may be definitely evaluated if the given values of two or more other known variables, having a certain functional relationship to the unknown variable, are set on two or more other scales and the discs are properly manipulated.

Pursuant to my invention, I reduce parallax to substantially zero by making the top disc of transparent material and locating the scales associated with the top disc on the lower surface of said disc where they will lie in substantially the same plane as the co-related scales on the top surface of the bottom disc. The figures for the scales on the top disc are provided in reverse so that when viewed through said disc, said figures will be intelligible.

To prevent confusion as to which disc any particular scale is on, the under surface of the top disc may be rendered opaque up to the reading contours of the scales on said disc, the observable parts of the co-related scales on the bottom disc lying on the other side of the reading contours. The term "opaque," as used herein, embraces fully opaque, semi-opaque and translucent. The opaquing is preferably accomplished by printing or spraying ink on the under surface of the top disc after the scale markings have been provided thereon so that said markings will be seen against an opaque background. The color of the opaquing ink desirably is in contrast with the color of the scale markings on the top disc and is noticeably different from the color of the bottom disc.

I eliminate the shade effect by having the transparent top disc extend radially beyond the scales on said disc. In this manner the scale markings on the bottom disc are read through a clear portion of the top disc and the reading contour is not formed by a cut-off edge rubbing against the lower disc and throwing a shadow on the very part of the bottom disc scale markings which must be clearly seen for accurate computation. It will be readily observed, moreover, that this arrangement does not increase the difficulty of reading between a top disc scale and a bottom disc scale since a well defined reading contour is provided by the edge of the opaquing ink background. Obviously, this opaque reading contour is so close to the bottom disc that it will cast no noticeable shadow line.

Windows can be provided in the top disc, without cutting the same out, by leaving portions of the top disc clear within the opaque background. Such windows create no shade effect and do not weaken the top disc. As a matter of fact, a window of this type can extend over a full 360° without separating the top disc into two parts.

The presence of such an unapertured window gives rise to many advantages. For example, heretofore, when two scales were placed on each disc and windows were not used because of the shade effect and weakening of the top disc, each scale could not cover more than 180°. Moreover, if a window were used, the scale on the window could not cover more than 90°. Windows provided in accordance with the present invention cause neither shade nor weakening of the disc so that their use is desirable, accordingly each peripheral scale may now extend over 360°. Furthermore, the window scale also can cover 360°. It will thus be apparent that the use of an unapertured window enables the scales to be of maximum length and maximum accuracy thus can be obtained.

Unapertured windows are particularly suitable for computers wherein the graduations which are on the bottom disc do not comprise a linear scale, but a system of curves coordinated to a reading contour on a window, which contour extends from a smaller to a larger radius, so that the reading occurs at varying radii according to the value of the variable calibrated along said reading contour.

Still another advantage of the unapertured window is in its use to reduce error arising from inaccurate displacement of the axis of rotation of the discs. It will be recalled that when, heretofore, two scales were placed on an unapertured (windowless) top disc and read in relation to two scales on the bottom disc, the scales had to be diametrically opposed and the reading error from one to another of diametrically opposed scales was twice the error in the location of the axis of rotation. In accordance with my invention where more than two scales are to be co-related, I may arrange one scale along the periphery of the bottom disc. A second scale is provided along part of the periphery of the top disc. An unapertured window with a third scale or a marking (which under the circumstances is equivalent to a scale) is placed on the top disc at the same side of the axis of rotation as the second scale, and a fourth scale on the bottom disc is read through the window. With such an arrangement the reading points (where the first scale is read against the second scale and the third scale is read against the fourth scale) are on substantially the same side of the center. If the scales do not extend over too great an angle (not more than about 270°) and if, with such a large angle, the scales on each disc are symmetrically arranged, the two reading points will always be considerably less than 180° apart and any major error thus avoided. Where the two reading points are on the same side of the axis of rotation and within a few degrees of each other, the error due to misplacement of said axis is in direct proportion to the difference in radii of the reading contours. For example, if the misplacement of the axis is one-thousandth of an inch and the window reading contour is three-quarters as far from the axis of rotation as the peripheral reading contour, the error in transferring from one to the other reading point is two and one-half ten-thousandths of an inch.

The flat scale carrying portion of each disc is in permanent rubbing engagement with the opposed flat portion of the other disc and, pursuant to an ancillary feature of my invention, the scale markings and associated symbols desirably are protected by covering the same, and, optionally, substantially the entire opposed surfaces of both discs, with thin, clear, transparent films of a suitable material such as a plastic applied for example, by laminating or spraying. Depending upon the degree of accuracy required such films may range in thickness from about one to ten one-thousandths of an inch. Even with such films the distance between the planes of the scales on the two discs is kept so small that the parallactic error is not allowed to exceed the permissible error for any specific computer.

Due to the optional incorporation of such films, where it is stated hereafter that the scales, graduations, markings, curves, opaquing, etc. are "adjacent" the upper surface of the bottom disc or the under surface of the top disc, it will be understood that such terminology indicates that the scales, etc. are on or close to such surfaces.

It is also pointed out that a thin clear member, say one hundredth of an inch thick, with an engraved Reading Line ("Index" or "Runner"), may be disposed between the two scale bearing discs without introducing any noticeable parallactic error.

Referring now in detail to the drawings and, more particularly, to Figs. 1–8, I have there shown a nautical Pitch-Speed-R. P. M. computer 20 embodying my invention. Said computer comprises a white opaque plastic bottom disc 22 (Fig. 1) and a transparent plastic top disc 24 (Fig. 4) of matching circular outlines provided with registered central apertures 26, 28 in which a hollow rivet 30 is snugly fitted so as to permit relative rotation of the discs. The upper surface of the bottom disc is unrelieved, i. e., flat, and is disposed in rubbing engagement with the flat under surface of the top disc. One end 32 of the rivet 30 is headed and the other end 34 spun over against a washer 36 whereby to secure said rivet in place.

Before assembly each disc has a plurality of co-related scales provided thereon, the scales on the bottom disc being imprinted or engraved on the upper flat surface thereof and the scales on the top disc being imprinted or engraved on the flat under surface thereof. More specifically, the bottom disc has imprinted on its upper surface a peripheral circularly segmental scale 38 covering about 240° and graduated from one to thirty in such manner as to increase logarithmically in a clockwise direction. This scale represents knots.

A second scale 40 is also imprinted on the same surface of the bottom disc. Said scale 40 is symmetrically disposed with regard to the scale 38 and both scales are located on the same side of the rivet 30. The scale 40 is likewise circularly segmental and both said scales, as well as all scales hereinafter described with regard to the computer 20, have said rivet as a center. Scale 40, which has a smaller radius of curvature and therefore lies within scale 38, is graduated from six to twenty-five and represents the pitch of a propeller in feet. Scales 38, 40 increase logarithmically in the same direction. The numerals and graduations of both scales are in black. The printing is extremely thin and is shown exaggeratedly in section in Fig. 3.

After printing, the bottom disc has a thin, clear plastic film 42 superimposed on its upper surface. This film is exaggeratedly shown in Fig. 2. The film may either be prefabricated and laminated to the disc 22, or it may be sprayed or cast on said disc, all of these methods being well known in the art of manufacturing flat plastic objects. By way of example, the relative thicknesses of the various elements may be one-tenth of an inch for the disc 22, one ten-thousandth of an inch for the printing of the scales 38, 40 and two one-thousandths of an inch for the protective film 42.

The top disc 24 has imprinted on its under surface a scale 46 comprising a circularly segmental set of graduations co-related with and designed to be read against scale 38. Said scale 46 is graduated logarithmically in a clockwise direction from twenty to two hundred R. P. M. A second scale 48 is imprinted on the under surface of the top disc. Said scale likewise is circularly segmental and is co-related with and designed to be read against scale 40; however, scale 40 is almost twice as long as scale 48. Scale 48 is graduated logarithmically in a counterclockwise direction and the figures thereof increase in clockwise direction from minus ten to plus forty. This scale 48 represents percentage of apparent slip. The numerals and graduations of all scales on the top disc are in red.

After the scales 46, 48 have been printed in any suitable fashion, an opaque buff-colored background 50 is provided, as by printing, on the under surface of the top disc. The peripheral contour of the background is a circle concentric with the scale 46 and may be of a diameter such as to overlap the inner ends of the graduations of the scale 38, thereby eliminating the need for radial registry of co-related scales. The contour of the opaque background is the reading contour for scale 46. Beyond said contour the disc has a transparent annular peripheral space 52 through which the scale 38 can be read.

A portion 54 of the disc 24 within the periphery of the background 50 is left clear to form a window in association with the scale 48 through which the scale 40 can be read. Said window is shorter than the scale 40 and will only expose enough of said scale to be read with the shorter scale 48.

After printing of the background 50, the under surface of the top disc has a thin clear plastic protective film 56 superimposed thereon in the same manner as the film 42. The film 56 and printing for the scales and background are exaggeratedly shown in Fig. 5 and are of the same relative order of thickness as the like elements of the bottom disc.

The top and bottom discs are joined by the rivet 30 after each disc has been completely printed and prepared as above described.

The several scales are so co-related as to satisfy the funtional relationship:

$$\text{Speed} = Q \times \text{R. P. M.} \times \text{Pitch} \times (1 - \text{Apparent slip})$$

where the speed in knots is found on scale 38, Q is a constant conversion factor to take care of the difference in units (e. g. feet, miles per hour, and revolutions per minute) and is set into the computer by the relative arrangement of the scales, R. P. M. is found on scale 46, the pitch in feet is found on scale 40 and (1—Apparent slip) is found on reciprocal scale 48.

Manipulation is the same as for any slide rule and may be best illustrated by an example.

Find a ship's speed if a propeller having a pitch of 17.5 feet turns at 87 R. P. M. and the ship's apparent slip is +10%. Set +10% on scale 48 to 17.5 on scale 40. The graduation on scale 38 across from 87 on scale 46 is the speed to be ascertained, in this instance 13.5 knots.

The foregoing relationship is that of multiplication and division but it will be apparent to those skilled in the art that many other relationships may be set up by properly mutually arranging the scales.

Figures 9, 10, 11, 12, 13, 14:
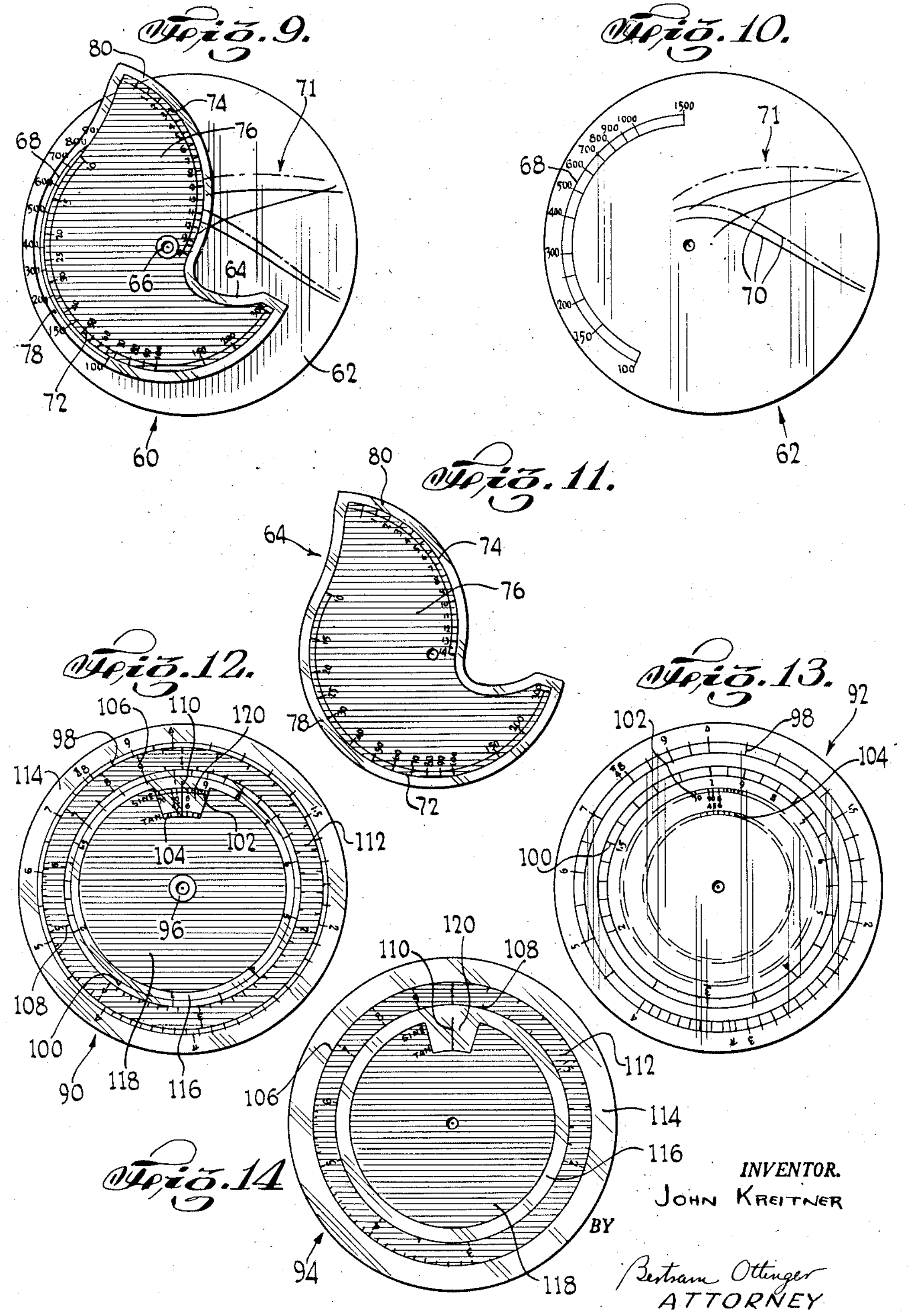
Fig. 9 is a top plan view of another rotary computer embodying the invention and which employs a non-circular top disc.
Figs. 10 and 11 are top plan views of the bottom and top discs, respectively, of the computer shown in Fig. 9.
Fig. 12 is a top plan view of a Mannheim rotary computer embodying the invention.
Figs. 13 and 14 are top plan views of the bottom and top discs, respectively, of the computer shown in Fig. 12.

Although in the form of the invention just described, the scales and the peripheries of the discs have been shown as circular, it should be understood that the invention is not limited to such a construction and arrangement, and in Figs. 9, 10 and 11 there is shown a capacity computer 60 having non-circular scales and a non-circular plate. Said computer comprises an opaque white flat bottom disc 62 to which a non-circular transpadent flat top plate 64 is rotatably secured by a rivet 66 at a point removed from the center of said bottom disc.

The bottom disc has imprinted on its upper surface a segmentally circular scale 68 for weight in tons and a plurality of radiating lines 70 each representing one compartment of a certain type of ship. The system of curves comprising the radiating lines 70 forms a second scale 71 on the bottom disc. The upper surface of the bottom disc and the scales thereon are covered by a transparent film.

The under surface of the top plate 64 has imprinted thereon a circular scale 72 for the stowage factor in cubic feet per ton and a scimitar-shaped scale 74 for free space in feet under the deck beams. An opaque background 76 is imprinted on the under surface of the top plate, said background extending up to the scales 72, 74 and leaving clear peripheral margins 78, 80 beyond said scales. Said under surface, and the scales and opaquing thereon, are covered by a transparent film.

The scales are so related that when the stowage factor is placed opposite the number of tons to be located in a specific compartment, the line 70 representing this compartment will intersect the scimitar-shaped scale 74 at a point which indicates the amount of free space left between the top of the cargo and the under side of the deck beams.

In Figs. 12, 13 and 14 there is shown a rotary Mannheim type computer 90 embodying another form of the invention wherein the unapertured window covers 360°. Said computer comprises an opaque, white, flat, circular bottom disc 92 to which a transparent, flat, circular top disc 94 is rotatably secured by a coaxially disposed rivet 96.

The bottom disc has imprinted upon its upper surface four circular scales, one radially within another. These are the outermost scale 98 graduated from one to ten logarithmically in a clockwise direction; an inner reciprocal scale 100 graduated from one to ten logarithmically in a counter-clockwise direction and having its index point co-radial with the index point of scale 98; a next inner sine scale 102 graduated from six to ninety degrees; and an innermost tangent scale 104 graduated from six to forty-five degrees. The upper surface of the bottom disc and the scales thereon are covered by a transparent film.

The under surface of the top disc 94 has imprinted thereon a circular scale 106 arranged to be read against the scale 98. Scale 106 is graduated from one to ten logarithmically in a clockwise direction. Said surface of the disc 94 has another scale 108 identical to the scale 106 but disposed radially inwardly thereof and adapted to be read against reciprocal scale 100. Said under surface carries an index line 110 co-radial with the index points of scales 106, 108 and adapted to be set against either the sine or tangent scale 102, 104. The under surface of the top disc has an opaque background 112 imprinted thereon between the scales 106, 108 leaving a clear peripheral margin 114 and an annular window 116. The scale 108 can be read through said window. The background also comprises an opaque central portion 118 for concealing the sine and tangent scales, said central portion having a clear space 120 through which short sections of the sine and tangent scale to both sides of the index line 110 can be seen. The under surface of the top disc, and the scales and opaquing thereon, are covered by a transparent plastic film.

The computer 90 is used in substantially the same fashion as a linear Mannheim slide rule, it being noted that it is not necessary to reverse said computer to read the sine and tangent scales.

I also contemplate providing a radially extending scale in the unapertured window and in Figs. 15, 16 and 17 I have shown a computer 130 embodying this form of the invention. The computer illustrated is designed to compute the altitude of a triangle and the distance from a base angle to the apex when the length of the base and the two base angles are known. This problem arises frequently in coastal navigation, for which the computer 130 was particularly contrived. In navigational terms the problem may be stated as follows: A landmark is seen from a ship. It is desired to know how far away the landmark is, and how close the ship will come to the landmark if the ship maintains its course. A bearing is taken on the landmark to ascertain the angle between the course of the ship and the line of sight to the landmark. This is called the "first angle." After an interval of time during which the same course is maintained a second bearing is taken to obtain the new angle between the ship's course and the line of sight. This is called the "second" angle. The first angle is a base angle of the triangle to be solved. The second angle is a function (the supplement) of the other base angle. The length of the base is the distance traversed by the ship between the two sights, called the "run." The distance from the ship to the landmark is referred to as the "distance off." When the ship is closest to the landmark it is said to be "abeam" the landmark. In such position the line from the landmark to the ship is perpendicular to the course of the ship.

The computer 130 comprises an opaque, white, flat circular bottom disc 132 to which a transparent, flat, circular top disc 134 is rotatably secured by a coaxially disposed rivet 136. The scales on the bottom disc are imprinted on the upper surface thereof and the scales on the top disc imprinted on the under surface thereof. The scales are embossed or etched in the various discs so that no transparent covering film is employed.

The bottom disc has a circular scale 138 for distance off graduated from one to one hundred nautical miles logarithmically in a clockwise direction. Said disc has a second scale 140 comprising a system of radiating curves 141 graduated in degrees for first angle.

The top disc has a circular scale 142 for distance run graduated from one to ten nautical miles logarithmically in a clockwise direction. Said top disc has a generally radial second scale 144 graduated in degrees for the second angle. This scale 144 is adapted to be set against first angle scale 140 for determining distance off when abeam (the altitude). A third, and likewise generally radial, scale 146 is provided on the top disc. This latter scale likewise is graduated in degrees for the second angle and is adapted to be set against the first angle scale 140 for determining distance off on the second bearing (the second side). Scale 146 is spaced arcuately from scale 144. The under surface of the top disc has an opaque background 148 imprinted thereon up to the radius of scale 142, said background being omitted between the second angle scales 144, 146 to provide an unapertured window 150 whose opposite, generally radial edges form the reading contours for said second angle scales. The background terminates short of the peripheral margin 151.

The divers scales are so related that when the first angle, on scale 140, is set to register with the second angle, on right hand scale 144, the distance run, on scale 142, is opposite the distance off when abeam, on scale 138. Similarly, when the left hand scale 146 is used for the second angle, the result read on scale 138 is the distance off on second bearing. Each curve 141 has a plurality of characterizing numerals imprinted in association therewith, the numerals being spaced sufficiently closely along each curve so that at least one numeral for every curve can be seen through the window 150 when a portion of that curve lies under said window.

The use of the scale can best be appreciated from the following example:

To determine distance off when abeam, given the first angle on the bow as 30°, the second angle on the bow as 70° and the distance run between taking of bearings as 6.6 miles, turn the top disc until the curve 141 for 30° in the window 150 registers with 70° on the right hand scale 144. Locate point 6.6 miles run on scale 142. Read across to scale 138 to find that the ship will be 4.8 miles off from the observed point when abeam thereof.

To determine distance off on the second bearing with the same data, turn the top disc until the curve 141 for 30° registers with 70° on the left hand scale 146. Opposite point 6.6 miles run on scale 142 it will now be seen that the ship is 5.1 miles away from the observed point at the moment the second bearing is taken.

It will be appreciated from the foregoing description that the term "scale" as used herein, denotes any means the position of which relative to another scale determines a certain state of a general relationship between values inscribed on said scales. Thus the term "scale" embraces a linearly arranged series of graduations extending in any direction along a line of varying or small to infinite curvature. The term also includes a family of lines.

To keep the drawings clear and simple, intermediate graduations have been omitted, in general, from the several scales, and in some instances portions only of some scales and graduations have been illustrated. It will be understood, however, that the extent to which any of the scales have been shown as subdivided, is by way of example and illustration only and is not to be construed as a limitation upon the invention.

It will thus be seen that I have provided rotary calculators which achieve the several objects of this invention and are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. A rotary computer comprising at least two flat superimposed discs mounted for relative rotation about an axis perpendicular to the planes of the discs with their juxtaposed flat faces in rubbing engagement, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, a scale on the top disc being located adjacent the under surface thereof and a scale on the bottom disc being located adjacent the upper surface thereof so as to dispose said scales in approximately the same plane and minimize parallactic error, said top disc being transparent so that said scale on its under surface can be read, and clear protective films superimposed on said scales.

2. A rotary computer comprising at least two flat superimposed discs mounted for relative rotation about an axis perpendicular to the planes of the discs with their juxtaposed flat faces in rubbing engagement, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, a scale on the top disc being located adjacent the under surface thereof and a scale on the bottom disc being located adjacent the upper surface thereof so as to dispose said scales in approximately the same plane and minimize parallactic error, said top disc being transparent so that said scale on its under surface can be read and an opaque backing under the scale on said top disc whose peripheral contour is the reading contour for said scale.

3. A computer as set forth in claim 2 wherein the bottom disc is opaque and of a color different from the opaque backing.

4. A computer as set forth in claim 2 wherein the bottom disc is opaque and of a color different from the opaque backing, and wherein the scales on the top and bottom disc respectively comprise markings whose colors are different from each other and from the opaque color of the discs on which they are located.

5. A rotary computer comprising at least two flat superimposed discs mounted for relative rotation about an axis perpendicular to the planes of the discs with their juxtaposed flat faces in rubbing engagement, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, a scale on the top disc being located adjacent the under surface thereof and a scale on the bottom disc being located adjacent the upper surface thereof so as to dispose said scales in approximately the same plane and minimize parallactic error, said top disc being transparent so that said scale on its under surface can be read, an opaque backing under the scale on said top disc extending only up to said scale and providing a reading contour therefor, said backing having an opening therein defining an unapertured window in said top disc, and another scale on said bottom disc readable through said window and co-related with at least one marking adjacent the under surface of said window.

6. A computer as set forth in claim 5 wherein the scale on the top disc extends only partly around said disc and wherein the window is on the same side of the rotary mounting means as said scale.

7. A rotary computer comprising at least two flat superimposed discs mounted for relative rotation about an axis perpendicular to the planes of the discs with their juxtaposed flat faces in rubbing engagement, each said disc having at least one scale thereon, said scales being mutually arranged in accordance with a certain functionl relationship between the variables represented by said scales, whereby through a series of operations including at least one relative angular setting of the discs, a definite value may be derived for one variable, if the values of the remaining variables are known, a scale on the top disc being located adjacent the under surface thereof and a scale on the bottom disc being located adjacent the upper surface therof so as to dispose said scales in approximately the same plane and minimize parallactic error, said top disc being transparent so that said scale on its under surface can be read, an opaque backing under the scale on said top disc extending only up to said scale and providing a reading contour therefor, said backing having an annular opening therein defining an unapertured window in said top disc, and another scale on said bottom disc readable through said window and co-related with at least one marking adjacent the under surface of said window.

8. A rotary computer comprising at least two flat superimposed discs mounted for relative rotation about an axis perpendicular to the planes of the discs, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, said top disc being transparent and having an opaque backing on its undersurface, said backing having an opening therein defining an unapertured window, a scale on the bottom disc being arranged to be readable through said window, and a scale on said top disc being associated with said window and being readable against said scale on the bottom disc.

9. A rotary computer comprising at least two flat superimposed discs mounted for relative rotation about an axis perpendicular to the planes of the discs, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, said top disc being transparent, means to opaque said top disc so as to leave a transparent window therein, a scale on the bottom disc arranged to be readable through said window, and a scale on said top disc being associated with said window and being readable against said scale on the bottom disc.

10. A rotary computer comprising at least two flat superimposed discs mounted for relative rotation about an axis perpendicular to the planes of the discs, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, said top disc being transparent and having an opaque backing on its undersurface, said backing having an opening therein defining an unapertured window one edge of which extends from a smaller to a larger radius and defines a reading contour, and a scale on said bottom disc being arranged to be readable through said window and against said contour.

11. A rotary computer comprising at least two flat superimposed discs mounted for relative rotation about an axis perpendicular to the planes of the discs, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, said top disc being transparent and having an opaque backing on its undersurface, said backing having an opening therein defining an unapertured window one edge of which extends from a smaller to a larger radius and defines a reading contour, and a scale on said bottom disc being arranged to be readable through said window and against said contour, a scale on said top disc being disposed along said reading contour.

12. A computer as set forth in claim 11 wherein the scale on the bottom disc comprises a family of curves extending from a smaller to a larger radius.

13. A rotary computer comprising at least two flat superimposed discs mounted for relative rotation about an axis perpendicular to the planes of the discs, each said disc having at least one scale thereon, said scales being mutually arranged in accordance with a certain functional relationship between the variables represented by said scales, whereby through a series of operations including at least one relative angular setting of the discs, a definite value may be derived for one variable, if the values of the remaining variables are known, said top disc being opaque and having a transparent window two spaced edges of which extend from smaller to larger radii, a pair of scales on said top disc being disposed one along each of said edges, and a scale on said bottom disc comprising a family of curves extending from a smaller to a larger radius arranged to be readable through said window and against either scale on the top disc.

14. A rotary computer for ascertaining the altitude of a triangle and the distance from a base angle to the apex when the length of the base and the two base angles are known, said computer comprising a top disc, a bottom disc, means to rotatably join said discs, a circular scale of distance on one of said discs, a circular scale of base distances on the other of said discs arranged to be read against said first named scale, said scales being coaxial with said rotatable joining means, a scale on one of said discs comprising a family of radiating lines each representing a different angular value for one of said base angles, and a pair of scales on the other of said discs each calibrated for the other base angle and arranged to be read against the scale for the first base angle, said scales being so related that when a value of the second base angle on one of said pair of scales is set against a value of the first base angle on the first base angle scale the value of the altitude on the first circular scale can be read against the value of the base on the circular base scale and when a value of the second base angle on the other of said pair of scales is set against a value of the first base angle on the first base angle scale, the value of the altitude on the first circular scale can be read against the value of the base on the circular base scale.

15. A rotary Mannheim computer comprising a circular bottom disc, a transparent circular top disc of the same diameter, means to rotatably join said discs, a pair of circular scales one on the top and the other on the bottom disc, said scales being arranged to be read against one another and being graduated logarithmically in the same direction, another pair of circular scales on the top and bottom discs disposed radially inwardly of said first pair of scales, said second pair of scales being arranged to be read against one another and being graduated logarithmically in opposite directions, circular sine and tangent scales on the bottom disc graduated logarithmically in the same direction as said first pair of scales, a radial mark in the top disc arranged to be set against said sine and tangent scales, all of said scales being disposed coaxially of the means for rotatably joining said discs, and an opaque background on said top disc having portions omitted which leave visible through said top disc all of both circular scales on said bottom disc and portions of said sine and tangent scales to both sides of the radial mark.

16. A rotary Mannheim computer comprising a circular bottom disc, a transparent circular top disc of the same diameter, means to rotatably join said discs, a pair of circular scales one on the top and the other on the bottom disc, said scales being arranged to be read against one another and being graduated logarithmically in the same direction, circular sine and tangent scales on the bottom disc graduated logarithmically in the same direction as said pair of scales, a radial mark in the top disc arranged to be set against said sine and tangent scales, all of said scales being disposed coaxially of the means for rotatably joining said discs, and an opaque background on said top disc having portions omitted which leave visible through said top disc the circular scale on the bottom disc and portions of the sine and tangent scale to both sides of the radial mark.

JOHN KREITNER.

REFERENCES CITED

The following references are of record in the file of this patent:

UNITED STATES PATENTS

| Number | Name | Date |
|---|---|---|
| 7,961 | Nystrom | Mar. 4, 1851 |
| 922,465 | Fenn | May 25, 1909 |
| 1,001,061 | Michaelson | Aug. 22, 1911 |
| 1,157,609 | Backstrand et al. | Oct. 19, 1915 |
| 1,161,065 | Myers | Nov. 23, 1915 |
| 1,484,176 | Haimes | Feb. 19, 1924 |
| 1,672,950 | Mittendorf | June 12, 1928 |
| 1,751,885 | Riehle | Mar. 25, 1930 |
| 1,780,078 | Hite | Oct. 28, 1930 |
| 2,303,018 | Bucklin | Nov. 24, 1942 |
| 2,334,287 | Reece | Nov. 16, 1943 |
| 2,334,725 | Perkins | Nov. 23, 1943 |
| 2,392,877 | Pym | Jan. 15, 1946 |
| 2,425,097 | Isom | Aug. 5, 1947 |
| 2,439,209 | Halsey | Apr. 6, 1948 |
| 2,443,882 | Allen | June 22, 1948 |

OTHER REFERENCES

"Graphical and Mechanical Computation," by Joseph Lipka, published in 1918 by John Wiley & Sons, Inc., of New York. (Paragraph 1 on page 1.)